United States Patent [19]

Buchholz et al.

[11] Patent Number: 5,045,614

[45] Date of Patent: Sep. 3, 1991

[54] PROCESS FOR POLYMERIZING VINYL MONOMERS USING AMINE CONTAINING COMPOUNDS WHICH SIMULTANEOUSLY ACT AS INITIATORS AND CROSSLINKING AGENTS AS PART OF A REDOX INITIATOR SYSTEM

[75] Inventors: Fredric L. Buchholz; James W. Ringer, both of Midland, Mich.

[73] Assignee: The Dow Chemical Company, Midland, Mich.

[21] Appl. No.: 334,824

[22] Filed: Apr. 7, 1989
(Under 37 CFR 1.47)

[51] Int. Cl.$^5$ ................................................ C08F 4/00
[52] U.S. Cl. ................................ 526/219.5; 526/217; 526/229; 526/317.1
[58] Field of Search .................... 526/217, 234, 219.5, 526/229, 317.1

[56] References Cited

U.S. PATENT DOCUMENTS

| | | | |
|---|---|---|---|
| 2,552,327 | 5/1951 | Kropa | 526/217 |
| 2,631,997 | 3/1953 | Stewart | 526/234 |
| 2,833,745 | 5/1958 | Fikentscher | 526/234 |
| 2,840,447 | 6/1958 | Green | 526/234 |
| 3,336,270 | 8/1967 | Monogle | 526/234 |
| 3,573,263 | 3/1971 | Gill | 526/219.5 |
| 3,658,772 | 4/1972 | Volk et al. | 526/234 |
| 4,145,501 | 3/1979 | Kaiya et al. | 526/217 |
| 4,201,848 | 5/1980 | Kotani et al. | 526/217 |
| 4,219,626 | 8/1986 | Wolfers et al. | 526/217 |
| 4,833,222 | 5/1989 | Siddall et al. | 526/200 |

FOREIGN PATENT DOCUMENTS

| | | | |
|---|---|---|---|
| 464223 | 4/1950 | Canada | 526/217 |
| 0224133 | 6/1987 | European Pat. Off. | 526/234 |
| 55-127404 | 10/1980 | Japan | 526/217 |
| 60-210609 | 10/1985 | Japan | 526/234 |
| 8601318 | 12/1986 | Netherlands | 526/234 |
| 773426 | 4/1957 | United Kingdom | 526/234 |
| 870711 | 6/1961 | United Kingdom | 526/234 |
| 974023 | 11/1964 | United Kingdom | 526/234 |

*Primary Examiner*—Joseph L. Schofer
*Assistant Examiner*—N. Sarofin

[57] ABSTRACT

This invention relates to an improved process for polymerizing vinyl monomers, the improvement comprising using an amine having a functionally effective amount of α-hydrogens to act as an initiator site and as a crosslinking site for development of a polymer chain. The amine compound acts as a reducing agent in a redox pair initiator system and has a sufficient number of α-hydrogens available for oxidation to render polymer chain growth from more than two locations on the amine. Through the various available α-hydrogens and thus polymer chains, the amine compound imparts crosslinking in the polymer and simultaneously acts as an initiator site for polymerization. The crosslinking is therefore produced out from the initiator/crosslinker, instead of by linking existing or growing polymer chains together. The method by which the crosslinking occurs in the present invention is thought to decrease the number of dangling chains present when conventional polymerization methods are used.

10 Claims, No Drawings

PROCESS FOR POLYMERIZING VINYL MONOMERS USING AMINE CONTAINING COMPOUNDS WHICH SIMULTANEOUSLY ACT AS INITIATORS AND CROSSLINKING AGENTS AS PART OF A REDOX INITIATOR SYSTEM

BACKGROUND OF THE INVENTION

This invention relates to a process for polymerizing vinyl monomers, more particularly this invention relates to a process for polymerizing an aqueous solution of a $\alpha,\beta$-ethylenically unsaturated monomer to produce water-swellable polymer.

Such polymerizations are typically carried out using redox initiator pairs and crosslinking agents. Examples of typical crosslinking agents include diacrylate or dimethacrylate esters of ethylene glycol; triacrylates or trimethacrylates of trimethylol propane and others. The crosslink is formed when growing polymer chains react with the vinyl groups of the typical crosslinking agent. During such polymerizations it is thought that the free radical generated by the initiator, produces dangling chains of polymer which may lead to undesirable residual monomers and uncrosslinked polymer.

Polymers which form hydrogels are used in fluid absorbing products such as disposable diapers, incontinent devices and sanitary napkins and are well known in the art. These polymers are typically prepared by polymerization of $\alpha,\beta$-ethylenically unsaturated monomers with crosslinking agents. The development of improvements in the processes for preparing these water-swellable polymers is desirable to produce improved products, eliminate by-products and increase production capacity. The improvements in the processes however, should not sacrifice excellent free swell capacity and extractable polymer content properties of the polymer.

SUMMARY OF THE INVENTION

Accordingly, the present invention is an improved process for polymerizing vinyl monomers, the improvement comprising using an amine having a functionally effective amount of $\alpha$-hydrogens to act as an initiator site and as a crosslinking site for development of a polymer chain.

Specifically, the present invention is a method for using an amine containing compound which acts as a reducing agent in a redox pair initiator system and also has a sufficient number of $\alpha$-hydrogens available for oxidation to render polymer chain growth from more than two locations on the amine. Through the various available $\alpha$-hydrogens and thus polymer chains, the amine compound imparts crosslinking in the polymer and simultaneously acts as an initiator site for polymerization. The crosslinking is therefore produced out from the initiator/crosslinker, instead of by linking existing or growing polymer chains together. The method by which the crosslinking occurs in the present invention is thought to decrease the number of dangling chains present when conventional polymerization methods are used.

DETAILED DESCRIPTION OF THE INVENTION

Although the present invention is useful in polymerizations of any $\alpha,\beta$-ethylenically unsaturated monomers, the present invention focuses on the water-soluble, $\alpha,\beta$-ethylenically unsaturated monomers which are capable of typical reactions by vinyl-addition polymerization in an aqueous solution with a crosslinking monomer to produce a water-swellable, and/or lightly crosslinked hydrophilic gel polymer such as those reactions described in U.S. Pat. No. 4,833,222.

Operable water-soluble $\alpha,\beta$-ethylenically unsaturated monomers useful in the present invention, include mono and polycarboxylic acids and acrylamide and its derivatives. Illustrative monocarboxylic acids are acrylic acid, methacrylic acid, crotonic acid and isocrotonic acid, as well as, alkali metal salts and ammonium salts thereof. Illustrative polycarboxylic acids would include maleic acid, fumaric acid and itaconic acid. Acrylamide derivatives would include methacrylamide and N,N-dimethylacrylamide. Preferred monomers are acrylic acid and methacrylic acid as well as their respective salt forms, such as, alkali metal or ammonium salts.

The water-soluble, $\alpha,\beta$-ethylenically unsaturated monomers useful in the present invention may be used in amounts ranging from about 10 weight percent to about 80 weight percent based on the total weight of the aqueous monomer solution to be polymerized. Preferably, the amount of such monomers ranges from about 10 percent to about 60 percent based on the total weight of the aqueous monomer solution. Most preferably, water-soluble monomers may be used in amounts ranging from about 15 weight percent to about 40 weight percent based on the total weight of the aqueous monomer solution. Optionally, minor amounts of water-soluble unsaturated monomers other than carboxylic acids, salts of the acids, acrylamide or its derivatives may be present. For example, alkyl esters of the acid monomers such as methylacrylate or methylmethacrylate may be used as comonomers.

Conventional vinyl addition polymerization initiators are typically used in the polymerization of water-soluble monomers and crosslinker. The process of the present invention includes an effective amount of amine containing compound which acts simultaneously as both the reduction half of a redox pair initiator system and a crosslinker. An effective amount of the amine containing compound is that amount which enables the amine compound to act as a reducing agent in the redox pair initiator system and as a crosslinker without adversely affecting high free swell capacity and low extractable polymer content properties of the polymer.

Typical oxidizing agents can be employed together with the amine containing compound to form the redox initiator system. The preferred oxidizing agents include potassium persulfate, ammonium persulfate, sodium persulfate and alkali metal persulfate.

An effective amount of oxidizing agent will depend upon the number of $\alpha$-hydrogens available for oxidation on the amine compound: that is there should be a sufficient amount of oxidizing agent for each $\alpha$-hydrogen on the amine compound in order to yield more than two polymer chains on the amine compound. These polymer chains effectuate the crosslinking in the polymer. Typically such an amount can range from about 0.05 to about 2.0 molar ratio of amine to oxidant. Preferably, the amount is from about 0.05 to about 1 molar ratio of amine to oxidant and more preferably, from about 0.1 to about 0.9 molar ratio of amine to oxidant.

The preferred oxidant is persulfate in an amount of one equivalent of persulfate per each $\alpha$-hydrogen present in the amine compound.

THE AMINE-CONTAINING COMPOUND

The amine compounds employable in the present invention are amines, mixtures of amines and their salts having a functionally effective amount of α-hydrogens to act as initiator sites.

A functionally effective amount of α-hydrogens available for oxidation on the amine containing compound is an amount greater than two α-hydrogens per amine compound which when oxidized and polymerized will yield more than two polymer chains growing from the amine, thus producing crosslinking in the polymer.

Typically, the number of α-hydrogens can range anywhere up to a practical number on a polyamine. Typically, the number of α-hydrogens present will be in the range of from about 3 to about 30. Preferably, the number of α-hydrogens present will be in the range of from about 3 to about 30. More preferably, the number of α-hydrogens present will be in the range of from about 3 to about 16. Most preferably, the number of α-hydrogens present will be in the range of from about 4 to about 12.

Examples of amine-containing compounds useful in the present invention typically include allylamines, di- and triamines, alkoxyamines and ammonium and iminium salts. Specific examples include: diallylamine, and 2-(dimethylamino)ethyl methacrylate; ethylenediamines such as tetraethylenediamine, tetramethylenediamine; propylene diamine such as N,N,N',N'-(3-pentamethylene)diamine; triamines and tetraamines such as N,N,N',N',N''-pentamethyl-diethylenediamine and hexamethylenetetraamine. Ammonium and iminium salts include examples such as: tetrabutyl ammonium chloride and dimethylmethyleneammonium chloride.

TYPICAL POLYMERIZATION CONDITIONS

For the aqueous solution copolymerization, according to the present invention, the water-soluble monomer, water and the initiator/crosslinker are mixed in a conventional manner prior to the copolymerization.

Mixing may be effected with static-in-line mixers or any other suitable mixing apparatus. The temperature during introduction of the polymerization initiator should be maintained such that the polymerization is not initiated prematurely, preferably, below the temperature of about 40° C., more preferably below about 35° C.

The polymerization temperature for the polymerization is preferably a relatively low temperature, as this in general increases the molecular weight of the resulting crosslinked polymer relative to that attained at higher temperatures.

In a preferred embodiment of this invention, the level of extractable polymer in the polymer from a monomer can be minimized by careful control of the temperature during the exothermic polymerization. Therefore, conducting the reaction under reduced pressure with agitation of the reactants is desirable to control temperature. The maximum reaction temperature for the polymerization, when preferred initiators are used, is in the range of from about 60° to about 120° C. More preferably, the maximum temperature is in the range from about 60° to about 90° C. External cooling jackets alone are generally not effective to provide the desired reaction temperature control when a large reaction vessel is used with a gel-like reaction product.

The amine containing compound, as part of a redox initiator system, can be used in other polymerization processes of the water-soluble α,β-ethylenically unsaturated monomers, such as an inverse emulsion polymerization. The resulting hydrated gel-like polymer may be used to prepare the water-swellable polymer composition by drying of the hydrated polymer gel. It is desirable to dry the hydrated polymer gel at as high an efficiency and in as short of time as possible in order to prevent the deterioration of the polymer by excessive heat.

The desirable method of drying comprises heating the polymer by hot air to a temperature of about 50° C. to about 200° C., optionally under reduced pressure, for a period of time sufficient to reduce the moisture content of the hydrated polymer gel to below about 40 percent, preferably below about 4 percent based on the total weight of absorbent polymer.

The absorbent polymer composition obtained by drying the hydrated polymer gel under heat is suitably comminuted into coarse particles, granules or a powder depending upon the desired size. The method of pulverization is not generally critical and any method known in the art can be employed.

Agitation of the reaction medium during polymerization can also be used to control the particle size.

The absorbent polymer composition of the present invention has excellent performance characteristics. The polymer has a high degree of polymerization because it has been prepared from the gel-like hydrated polymer formed by copolymerization in an aqueous solution at a relatively high solids concentration.

If the monomer employed is an acid containing monomer, the extractable polymer content can be determined by extracting 1 gram of absorbent polymer at room temperature for 16 hours with 300 grams of 0.9 percent aqueous sodium chloride. The swollen polymer is filtered off and the filtrate titrated with 0.1 Normal hydrochloric acid to determine the level of soluble polymer present.

TEST PROCEDURES FOR THE POLYMER

The shear modulus of the polymer is tested by first being swollen to the maximum capacity with a 0.9 percent aqueous sodium chloride solution and the excess removed. Approximately 1.5 cc of the swollen polymer is placed in the gap between two plates of a stress rheometer.

The shear modulus of the polymer is determined by using a stress rheometer which comprises a lower plate onto which the swollen polymer is placed. An upper plate parallel to the lower plate and having the same dimensions as the lower plate is positioned above the lower plate. The upper plate is lowered to apply pressure to the lower plate. An oscillating torque is applied torsionally to the lower plate and the resulting displacement is determined as a function of the applied torque.

The shear modulus is then calculated from the ratio of the applied stress to the amplitude of the in-phase component of the resultant strain on the polymer The shear modulus is reported in dynes/cm$^2$.

The absorbent capacity of the polymer is determined by allowing 0.5000 g to absorb its limit of 100 g of a 0.9 percent aqueous sodium chloride solution in 30 minutes with brief stirring every ten minutes at room temperature. For more reproducible results the polymer is screen cut by a 40-60 mesh cut or a 60-80 mesh cut. The mixture is suction filtered to remove the excess saline solution. The excess salt solution which is not absorbed is weighed and subtracted from the original 100 g to give the filtered free swell capacity (FFSC) value. The absorbent polymer compositions of the present invention exhibit absorbent capacities of at least about 10 g/g, more preferably at least about 20 g/g, and most preferably at least about 40 g/g. Absorbent capacities up to about 80 g/g have been observed.

EXAMPLE

The following examples illustrate preparation of a polymer using a redox initiator system containing the amine compound and persulfate initiator. The examples are not meant to limit the scope of the invention but are intended to be illustrative of the invention and the performance of polymers prepared by such a process.

EXAMPLE 1

In a beaker is dissolved 97 g of sodium carbonate in water. In a second beaker is added 200 g of acrylic acid and 0.5 Gram of VERSENEX ® 80 chelating agent (40 percent aqueous solution of pentasodium salt of diethylenetriaminepentaacetic), available from The Dow Chemical Company. The reactor is twice evacuated and repressurized with nitrogen gas. The acrylic acid through a dip tube to the reactor and when complete, the sodium carbonate solution is similarly added. The solution is agitated at stir bar while sparging the solution with nitrogen gas at a pressure of approximately 0.75 psi. An amount of tetramethylethylenediamine (TMEDA) dissolved in water and persulfate dissolved in water is prepared separately to yield approximately a 0.16 molar ratio of TMEDA to persulfate. The TMEDA solution is added to the reactor and after 5 minutes, the sodium persulfate solution is added to the mixture.

The reactor is maintained at a temperature of no more than 70° C. by, if necessary, a heated jacket around the reactor to elevate the temperature or a vacuum to reduce the pressure to lower the temperature in the reactor. The reaction is allowed to proceed until complete as evidenced by complete conversion of the monomers to polymer. (Gelation generally occurs at about 1 percent conversion and is not indicative of complete reaction.) The reaction contents are held at a reaction temperature of about 70° C. after completion of the reaction. If the monomer salt of acrylic acid is not used during the polymerization then the gel is neutralized by mixing a crumbled known amount in the reactor with 25 weight percent aqueous solution of sodium carbonate such that about 70 percent of the carboxylic acid groups present in the polymer are neutralized. The gel is then dried in an oven at about 110° to 150° C. After drying, the polymer is cooled to room temperature and pulverized in a Waring Commercial Blendor ®.

The shear modulus of the polymer is tested by first being swollen to the maximum capacity with a 0.9 percent aqueous sodium chloride solution and the excess removed. Approximately 1.5 cc of the swollen polymer is placed in the gap between two plates of a stress rheometer.

The shear modulus of the polymer is determined by using a stress rheometer which comprises a lower plate onto which the swollen polymer is placed. An upper plate parallel to the lower plate and having the same dimensions as the lower plate is positioned above the lower plate. The upper plate is lowered to apply pressure to the lower plate. An oscillating torque is applied torsionally to the lower plate and the resulting displacement is determined as a function of the applied torque.

The shear modulus is then calculated from the ratio of the applied stress to the amplitude of the in-phase component of the resultant strain on the polymer. The shear modulus is reported in dynes/cm$^2$.

The filtered free swell capacity (FFSC) is determined by allowing 0.5000 g of polymer to absorb its limit of 100 g of a 0.9 percent aqueous sodium chloride solution in 30 minutes with brief stirring every ten minutes at room temperature. For more reproducible results the polymer is screen cut by a 40-60 mesh cut or a 60-80 mesh cut. The mixture is suction filtered to remove the excess saline solution. The excess salt solution which is not absorbed is weighed and subtracted from the original 100 g to give the filtered free swell capacity (FFSC) value.

Extractable polymer content is determined by extracting 1 g of absorbent polymer granules for 16 hours with 300 g of a 0.9 percent solution of aqueous sodium chloride. The swollen polymer is filtered off and the filtrate is titrated with hydrochloric acid to determine the level of extractable polymer present.

The data in the following Table depicts the absorbent properties of the polymer prepared using the various amine compounds as part of an initiator package with persulfate.

Each of the examples of the Table are polymerized similarly to Example 1. The variants from Example 1 are those listed in the Table.

TABLE

Polymerization of Sodium Acrylate with an Ethylenediamine/Sodium Persulfate Initiator

| Example | Amine (A) | Weight percent (A) based on Sodium Acrylate | Persulfate (p) Weight percent based on Sodium Acrylate | (A)/(P) molar ratio | FFSC | Shear Modulus | Percent Extractables |
|---------|-----------|---------------------------------------------|--------------------------------------------------------|---------------------|------|---------------|----------------------|
| 1 | Me$_2$NCH$_2$CH$_2$NMe$_2$ | 0.27 | 3.21 | 0.16 | 22.8 | 33900 | 10.3 |
| 2 | (HO$_2$CCH$_2$)$_2$NCH$_2$CH$_2$N(CH$_2$CO$_2$H)$_2$ | 0.77 | 3.57 | 0.16 | 21.9 | 37400 | 8.6 |
| 3 | Et$_2$NCH$_2$CH$_2$NEt$_2$ | 0.35 | 2.86 | 0.16 | 21.4 | 38300 | 7.4 |
| 4 | MeN(H)CH$_2$CH$_2$N(H)Me | 0.23 | 3.57 | 0.16 | 22.2 | 32000 | 9.5 |
| 5 | H$_2$NCH$_2$CH$_2$NH$_2$ | 0.16 | 3.57 | 0.16 | 15.0 | 42600 | 4.0 |

What is claimed is:

1. An improved process for producing a water-swellable polymer having excellent free swell capacity and relatively low extractable polymer content, comprising:
polymerizing an aqueous solution of an α,β-ethylenically unsaturated monomer with an amine having a functionally effective amount of α-hydrogens that act as an initiator site and as a crosslinking site for development of a polymer chain and a persulfate initiator component, wherein the amine and persulfate are present in an amount of about 0.05 to about 2.0 molar ratio of amine to persulfate.

2. The process of claim 1 wherein the amine is part of an initiator system comprising the amine and a persulfate and the amine and persulfate are present in an amount of from about 0.1 to about 0.9 molar ratio of amine to persulfate.

3. The process of claim 2 wherein the $\alpha,\beta$-ethylenically unsaturated monomer consists of acrylic acid in an amount of from about 10 to about 80 weight percent based on the total weight of the aqueous monomer solution.

4. The process of claim 1 wherein the $\alpha,\beta$-ethylenically unsaturated is acrylic acid and is present in an amount of from about 10 to about 60 weight percent based on the total weight of the aqueous monomer solution.

5. The process of claim 1 wherein the $\alpha,\beta$-ethylenically unsaturated monomer is acrylic acid and is present in an amount of from about 15 to about 40 weight percent based on the total weight of the aqueous monomer solution.

6. An improved process for producing a water-swellable polymer polymerizing an aqueous solution of an $\alpha,\beta$-ethylenically unsaturated monomer, the improvement comprising using an amine having a functionally effective amount of $\alpha$-hydrogens to act as an initiator site and as a crosslinking site for development of a polymer chain, wherein the amine is part of a redox initiator system comprising the amine and a persulfate, the amine present in an amount of about 0.05 to about 2.0 molar ratio of amine to persulfate.

7. A process of claim 6 wherein the amine is part of an initiator system comprising the amine and a persulfate and the amine and persulfate are present in an amount of from about 0.1 to about 0.9 molar ratio of amine to persulfate.

8. A process of claim 6 wherein the functionally effective amount of $\alpha$-hydrogens is in the range of from about 3 to about 30.

9. A process of claim 6 wherein the functionally effective amount of $\alpha$-hydrogens is in the range of from about 3 to about 16.

10. A process of claim 6 wherein the functionally effective amount of $\alpha$-hydrogens is in the range of from about 4 to about 12.

* * * * *